(12) United States Patent
Gilman et al.

(10) Patent No.: US 7,707,405 B1
(45) Date of Patent: Apr. 27, 2010

(54) SECURE INSTALLATION ACTIVATION

(75) Inventors: Robert R. Gilman, Broomfield, CO (US); Richard L. Robinson, Broomfield, CO (US); Robert J. Serkowski, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1541 days.

(21) Appl. No.: 10/947,418

(22) Filed: Sep. 21, 2004

(51) Int. Cl.
H04L 29/00 (2006.01)
H04L 9/32 (2006.01)
G06F 21/00 (2006.01)

(52) U.S. Cl. .................. 713/156; 713/159; 713/173; 713/185; 726/9

(58) Field of Classification Search .............. None
See application file for complete search history.

(56) References Cited

U.S. PATENT DOCUMENTS

| | | | |
|---|---|---|---|
| 4,288,659 A | 9/1981 | Atalla | 178/22.08 |
| 4,405,829 A | 9/1983 | Rivest et al. | |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,005,122 A | 4/1991 | Griffin et al. | |
| 5,157,663 A | 10/1992 | Major et al. | |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |

(Continued)

FOREIGN PATENT DOCUMENTS

EP         1071253        1/2001

(Continued)

OTHER PUBLICATIONS

Arsys, "Public Key Infrastructure," (Feb. 4, 2001), available at http://www.transactiontrust.com/technicaindex.html, 4 pages.

(Continued)

*Primary Examiner*—Nasser Moazzami
*Assistant Examiner*—Fatoumata Traore
(74) *Attorney, Agent, or Firm*—Sheridan Ross P.C.

(57) ABSTRACT

A system 100 for providing credentials to a computational component in a distributed processing network is provided. The system 100 includes: (a) a plurality of crypto-tokens 150*a-n*, each crypto-token 150*a-n* comprising a unique identifier, optionally a digital certificate comprising a unique public key and the unique identifier, and a private key corresponding to the public key; (b) a provisioning system 100 comprising a certificate authority 104 operable to generate the plurality of crypto-tokens 150*a-n*; and (c) a computational component 128 comprising a drive operable to receive and communicate with a selected crypto-token 150. The computational component 128 uses the digital certificate and private key in any of the crypto-tokens 150*a-n* to establish a secured communication session with the provisioning system 100. Before the establishing operation, any of the plurality of crypto-tokens 150*a-n* can be engaged with the computational component 128 to establish the secure communication session.

32 Claims, 7 Drawing Sheets

U.S. PATENT DOCUMENTS

| | | | |
|---|---|---|---|
| 5,329,570 A | 7/1994 | Glassmacher et al. | |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | |
| 5,708,709 A | 1/1998 | Rose | |
| 5,717,604 A | 2/1998 | Wiggins | |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A | 4/1998 | Wyman | |
| 5,754,761 A | 5/1998 | Willsey | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A | 8/1998 | Coley et al. | 380/4 |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | 395/187.01 |
| 5,935,243 A | 8/1999 | Hasebe et al. | |
| 5,940,504 A | 8/1999 | Griswold | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,498,791 B2 | 12/2002 | Pickett | |
| 6,502,079 B1 | 12/2002 | Ball et al. | |
| 6,513,117 B2 | 1/2003 | Tarpenning et al. | |
| 6,513,121 B1 | 1/2003 | Serkowski | 713/201 |
| 6,539,481 B1 | 3/2003 | Takahashi et al. | |
| 6,557,105 B1 | 4/2003 | Tardo et al. | |
| 6,574,612 B1 | 6/2003 | Baratti et al. | |
| 6,584,454 B1 | 6/2003 | Hummel, Jr. et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,760,324 B1 | 7/2004 | Scott et al. | |
| 6,765,492 B2 | 7/2004 | Harris | |
| 6,769,063 B1 | 7/2004 | Kanda et al. | |
| 6,775,782 B1 | 8/2004 | Buros et al. | |
| 6,778,820 B2 | 8/2004 | Tendler | |
| 6,795,941 B2 | 9/2004 | Nickels | |
| 6,816,842 B1 | 11/2004 | Singh et al. | |
| 6,826,606 B2 | 11/2004 | Freeman et al. | |
| 6,842,896 B1 | 1/2005 | Redding et al. | |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,957,344 B1 | 10/2005 | Goldshlag et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 6,993,664 B2 | 1/2006 | Padole et al. | |
| 7,032,113 B2 | 4/2006 | Pendlebury | |
| 7,035,918 B1 | 4/2006 | Redding et al. | |
| 7,065,214 B2 | 6/2006 | Ishiguro et al. | |
| 7,073,063 B2 | 7/2006 | Peinado | |
| 7,080,402 B2 | 7/2006 | Bates et al. | |
| 7,085,382 B2 | 8/2006 | Terao et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,225,333 B2 | 5/2007 | Peinado et al. | |
| 7,228,426 B2 | 6/2007 | Sinha et al. | |
| 7,308,717 B2 | 12/2007 | Koved et al. | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,356,692 B2 | 4/2008 | Bialick et al. | |
| 7,382,881 B2 | 6/2008 | Uusitalo et al. | |
| 7,383,205 B1 | 6/2008 | Peinado et al. | |
| 7,415,729 B2 | 8/2008 | Ukeda et al. | |
| 7,545,931 B2 | 6/2009 | Dillaway | |
| 7,552,166 B2 | 6/2009 | Chack | |
| 2001/0001268 A1 | 5/2001 | Menon et al. | |
| 2001/0013024 A1 | 8/2001 | Takahashi et al. | |
| 2001/0034846 A1 | 10/2001 | Beery | |
| 2002/0013722 A1 | 1/2002 | Kanaga | |
| 2002/0017977 A1 | 2/2002 | Wall | |
| 2002/0038422 A1 | 3/2002 | Suwamoto et al. | |
| 2002/0052939 A1 | 5/2002 | Lee | |
| 2002/0083003 A1 | 6/2002 | Halliday et al. | |
| 2002/0087892 A1 | 7/2002 | Imazu | |
| 2002/0104006 A1 | 8/2002 | Boate et al. | |
| 2002/0107809 A1 | 8/2002 | Biddle et al. | |
| 2002/0112186 A1 | 8/2002 | Ford et al. | |
| 2002/0116340 A1 | 8/2002 | Hellberg et al. | |
| 2002/0138441 A1 | 9/2002 | Lopatic | |

| | | |
|---|---|---|
| 2002/0154777 A1 | 10/2002 | Candelore |
| 2002/0164025 A1 | 11/2002 | Raiz et al. |
| 2002/0169625 A1 | 11/2002 | Yang et al. |
| 2002/0176404 A1 | 11/2002 | Girard |
| 2002/0188656 A1 | 12/2002 | Patton et al. |
| 2002/0188704 A1 | 12/2002 | Gold |
| 2003/0005291 A1* | 1/2003 | Burn ......................... 713/159 |
| 2003/0005427 A1 | 1/2003 | Herrero |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1 | 5/2003 | Abburi et al. |
| 2003/0095542 A1 | 5/2003 | Chang et al. |
| 2003/0115466 A1* | 6/2003 | Aull et al. .................. 713/172 |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1 | 8/2003 | Mayer et al. |
| 2003/0163428 A1 | 8/2003 | Schneck et al. |
| 2003/0177393 A1 | 9/2003 | Ishiguro |
| 2003/0191936 A1* | 10/2003 | Kawatsura et al. ......... 713/156 |
| 2003/0208449 A1 | 11/2003 | Diao |
| 2003/0233547 A1 | 12/2003 | Gaston et al. |
| 2004/0010469 A1 | 1/2004 | Lenard et al. |
| 2004/0044629 A1 | 3/2004 | Walker et al. |
| 2004/0044630 A1 | 3/2004 | Walker et al. ................. 705/59 |
| 2004/0044631 A1 | 3/2004 | Walker et al. ............... 713/200 |
| 2004/0044901 A1 | 3/2004 | Serkowski et al. .......... 713/200 |
| 2004/0047354 A1 | 3/2004 | Slater et al. |
| 2004/0054909 A1 | 3/2004 | Serkowski et al. .......... 713/200 |
| 2004/0054930 A1 | 3/2004 | Walker et al. ................. 705/59 |
| 2004/0073517 A1 | 4/2004 | Zunke et al. |
| 2004/0078339 A1 | 4/2004 | Goringe et al. ............... 705/59 |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. ............... 713/201 |
| 2004/0133794 A1 | 7/2004 | Kocher et al. |
| 2004/0166878 A1 | 8/2004 | Erskine et al. |
| 2004/0172367 A1 | 9/2004 | Chavez ......................... 705/59 |
| 2004/0181695 A1 | 9/2004 | Walker ....................... 713/202 |
| 2004/0181696 A1 | 9/2004 | Walker ....................... 713/202 |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0091507 A1 | 4/2005 | Lee et al. |
| 2005/0144437 A1 | 6/2005 | Ransom et al. |
| 2005/0154877 A1* | 7/2005 | Trench ....................... 713/156 |
| 2005/0185792 A1 | 8/2005 | Tokutani et al. |
| 2005/0198510 A1 | 9/2005 | Robert et al. |
| 2005/0202830 A1 | 9/2005 | Sudit |
| 2005/0229004 A1 | 10/2005 | Callaghan |
| 2005/0246098 A1 | 11/2005 | Bergstrom et al. |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 8/2006 | Aggarwal et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0107067 A1 | 5/2007 | Fountian |
| 2007/0219917 A1 | 9/2007 | Liu et al. |
| 2008/0082449 A1 | 4/2008 | Wilkinson et al. |
| 2008/0141242 A1 | 6/2008 | Shapiro |

FOREIGN PATENT DOCUMENTS

| | | |
|---|---|---|
| EP | 1562378 | 8/2005 |
| JP | 2006/085481 | 3/2006 |

OTHER PUBLICATIONS

Articsoft Limited, "Public Key Infrastructure (PKI) FAQs" (Feb. 2, 2003), available at http://www.articsoft.com/wp_pki_faq.htm, 5 pages.

"Digital Cinema Key Management Messages," Draft 1 (Aug. 8, 2002), pp. 1-9.

Entrust Inc., "Entrust Authority Security Manager," (printed Aug. 13, 2004), avaiable at http://www.entrust.com/authority/manager/index.htm, 23 pages.

Infosec Engineering, "Building a Corporate Public Key Infrastructure" (1999), available at http://www.infoseceng.com/corppki.htm, 20 pages.

LockStream Corporation, "Catalyst DRM Service Platform" (printed Aug. 13, 2004), available at http://www.lockstream.com/products_spcm.php, 1 page.

LockStream Corporation, "Lockstream KeyDRM" (printed Aug. 13, 2004), available at http://www.lockstream.com/products_1gm.php, 2 pages.

LockStream Corporation, "Lockstream OMA 1.0 DRM Client" (printed Aug. 13, 2004), available at http://www.lockstream.com/products_sprm.php, 2 pages.

U.S. Appl. No. 11/051,316, Mazza.

LockStream Corporation, Catalyst DRM Service Platform Architecture, Vers. 1.0 (Nov. 2003), pp. 1-28.

Novell®, "Certificate Server: Public Key Infrastructure," White Paper (1999), pp. 1-10.

Russinovich, Mark, "Inside Encrypting Fily System, Part 1, "Windows & .Net Magazine (Jun. 1999), available at http://www.winntmag.com/Articles/Index.cfm?ArticleID=5387 &Key=Internals, 4 pages.

Russinovich, Mark, "Inside Encrypting Fily System, Part 2," Windows & .Net Magazine (Jul. 1999), available at http://www.winntmag.com/Articles/Index.cfm?ArticleID=5592 &Key=Internals, 5 pages.

Security Config, Back Up Your Encrypting File System Private Key in Windows 2000 Download (Printed Aug. 13, 2004), avaiable at http://www.securityconfig.com/software/alerts/back_up_your_encrypting_file_system_private_key_in_windows_2000.html, 2 pages.

SSH Communications Security Corp., "Enabling Virtual Public Networks with Public Key Infrastructure," White Paper (Jan. 2004), pp. 1-9.

Streetman, Kibbee K. et al., "Public Key Infrastructure: Resources, Requirements and Recommendations," ATI IPT Special Report 00-06 (Apr. 2000), pp. 145.

Whatis.com Target Search™, "PKI" (Jan. 13, 2004), available at http://whatis.techtarget.com/definition/0,2989893,sid9_gci214299,00.html, 4 pages.

Info Merchant Store website, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.

VeriFone Inc. website, "VeriFone Payment Solutions: Point-of-Sale PINpads" (1997-2004), available at http://www.verifone.com/products/printers_peripherals/html/pinpad_family.html, 1 page.

ADTech Engineering, IP Phone Sl-160 User Manual (SCCP releases) Version 1.2 (2002), pp. 1-20.

"The Cricket Indoor Location System: An NMS Project @ MIT LCS" at http://nms.lcs.mit.edu/projects/cricket (Jul. 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network with Smart Card Technology" available at www.datakey.com, pp. 1-8.

U.S. Appl. No. 10/775,498, filed Feb. 9, 2004, Gilman et al.

U.S. Appl. No. 10/811,412, filed Mar. 25, 2004, Walker.

U.S. Appl. No. 10/405,176, filed Apr. 1, 2003, Mazza et al.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Vendor Wrapper Service Provider" at http://msdn.microsoft.com/library/en-us/security/security/vendor_wrapper_service_provider.asp (Aug. 2002), pp. 1-2.

"Global Control of All Buying and Selling Now Possible," *Discerning the Times Digest and Newsbytes*, vol. 1, Iss. I (Jan. 2000), available at http://www.discerningtoday.org/members/Digest/2000Digest/January/Global%20Control.htm, 2 pages.

NEC Infrontia Corporation Press Release Establishment of "SmartCardInfrontia" solutions for "IC card," (Mar. 13, 2002), 4 pages.

Smart Card Alliance, "Industry News: Cubic Introduces New Mobile Ticketing Machine" (Jul. 3, 2003), available at http://www.smartcardalliance.org/industry_news/industry_news_item.cfm?itemID=852, 2 pages.

Smart Card Alliance, "Industry News: Cubic Corp. Introduces New National Security and Homeland Defense" (Sep. 9, 2002), available at http://www.smartcardalliance.org/industry_news/industry_news_item.cfm?itemID=310, 2 pages.

Motorola Press Release, "ERG Motorola Alliance Receives Award for Smart Card" (Jun. 6, 2000), available at http://www.motorola.com/LMPS/pressreleases/page888.htm, 3 pages.

"Smart Card Overview," Sun Developer Network, Sun Microsystems, Inc. (1994-2004), available at http://java.sun.com/products/javacard/smartcards.html, 2 pages.

Griswold, Robert S., "Get Smart: The Coming Revolution of Smart Cards," *Journal of Property Management* (May/Jun. 1997), 5 pages.

"Smart Card," NetLingo Dictionary of Internet Words (1995-0004), available at http://www.netlingo.com/lookup.cfm?term=smart+card, 2 pages.

"Smart Card Handbook," Homepage of Wolfgang Rankl (Jun. 13, 2004), available at http://www.wrankl.de/SCH/SCH.html, 8 pages.

Sun Microsystems, Inc. Java Cryptography Architecture API Specification & Reference, Aug. 4, 2002, 56 pages.

Java Skyline: Java Servlet/Server Headline News, Oct. through Dec. 1998, pp. 1-3.

Matlab Installation Guide for PC, Release 11, the MathWorks Inc, 1999.

Microsoft Systems Management Server 2.0 Resource Guide, Microsoft Press, 1999. ISBN 0-7356-0583-1.

Windows NT Server 4. Garms, Jason. SAMS Publishing, 1998. ISBN 0-672-31249-2.

FLEXlm End Users Guide, Version 9.2. Jul. 2003. Published by Macrovision. 166 pages.

A. Menezes, P. van Oorschot and S. Vanstone, Handbook of Applied Cryptography, cr8523_01[1].pdf, Chapter 1, 48 pages.

A. Menezes, P. van Oorschot and S. Vanstone, Handbook of Applied Cryptography, cr8523_1 0[1].pdf, Chapter 10, 40 pages.

A. Menezes, P. van Oorschot and S. Vanstone, Handbook of Applied Cryptography, cr8523_12[1].pdf, Chapter 12, 53 pages.

Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, pp. 1-6.

Kuchinskas, Susan, Keeping content safe is a big job and everyone has to do it: the security of its corporate content can make or break Topps. (Topps employs security consultant to watch network traffic), Jul. 2003, 2003 Online, Inc., pp. 1-5.

Multos Fights on, Jan. 2004, Thomson Media, Inc., pp. 1-7.

\* cited by examiner

SECURE INSTALLATION ACTIVATION

CROSS REFERENCE TO RELATED APPLICATION

Cross reference is made to U.S. patent application Ser. Nos. 10/811,412, filed Mar. 25, 2004, now U.S. Pat. No. 7,272,500, entitled "Global Positioning System Hardware Key for Software Licenses"; and 10/956,861, filed Sep. 30, 2004, entitled "Certificate Distribution Via License Files", each of which is incorporated herein by this reference.

FIELD OF THE INVENTION

The invention relates generally to software and/or hardware and particularly to the application of cryptographic algorithms to software and/or hardware provisioning.

BACKGROUND OF THE INVENTION

Distributed software systems that operate over an open network, particularly a Wide Area Network such as the Internet, often have the need for secure communications over the network and authentication between system elements to prevent spoofing and other security breaches. Various protocols have been used to provide such security. Exemplary protocols include the Secure Sockets Layer or SSL, Transport Layer Security or TLS, Secure-HTTP, and IP Security or IPSEC.

Instrumental in these protocols are cryptographic mechanisms. Two primary cryptographic mechanisms are secret key and public key cryptography. Secret key is a type of symmetric encryption in which both parties know and use the same or shared secret key to encrypt and decrypt communications. Encryption algorithms, or ciphers, based on the secret key, mathematically transform or encrypt the plain text in the message into cipher text. The same key and algorithm are used by the other party to decrypt the cipher text. Public key cryptography is a type of asymmetric encryption that uses pairs of different keys, one for encryption and one for decryption. One of the keys or private key is kept secret by a party and the other key or public key is provided freely to other parties. When plain text is converted into ciphertext or encrypted using the private key, it may be converted back into plain text only using the public key and vice versa. The Rivest-Shamir-Adleman or RSA algorithm is one of the most widely used public key algorithms.

Figure 2:
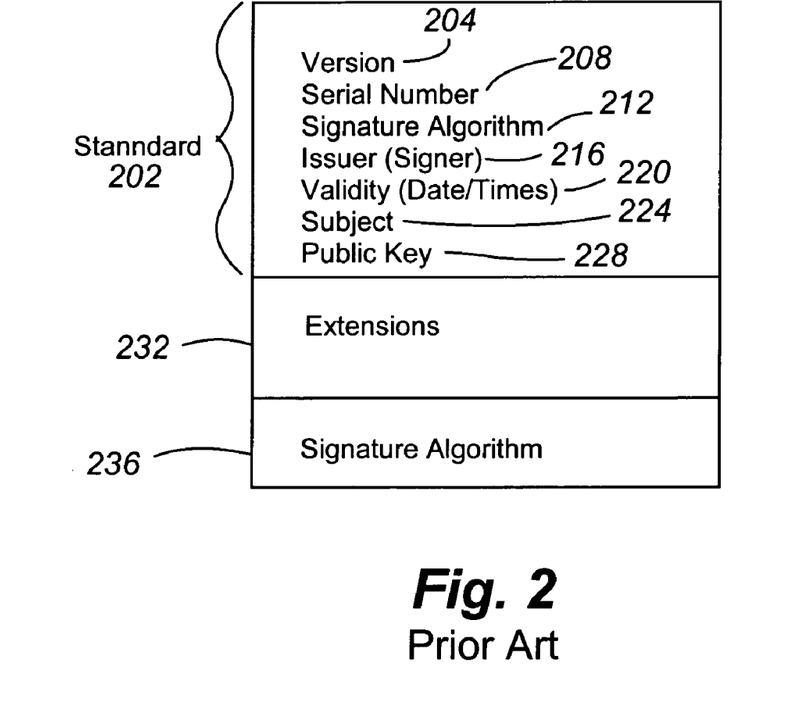
FIG. 2 depicts the format of a digital certificate.

The SSL protocol uses the Public Key Infrastructure or PKI, a form of public key cryptography, to secure communications over otherwise unsecured networks. RSA, together with the X.509 standard for digital certificates, form the basis of PKI. A certificate 200 according to the X.509 standard is shown in FIG. 2. The standard portion 202 of X.509 includes the version 204 (which indicates the particular version of the X.509 standard), serial number 208 (which is assigned by the certificate authority and uniquely identifies the certificate), signature algorithm 212 (which identifies the algorithm used in the digital signature), issuer or signer 216 of the certificate (which identifies the certificate authority that issued the certificate), period of validity 220 for the certificate (which identifies both the earliest and latest times that the certificate is valid), the subject or owner 224 of the public key, and the public key 228 of the owner of the certificate. Extensions 232 provide a location for issuers to add their own private information to the certificate. It can include authority and subject key identifiers, key usage, private key usage period, and a list of permitted use and restrictions on usage for the certificate. The certificate 200 further includes the digital signature field 236 (encrypted using the private key of an issuing entity). The digital signature field includes the signature algorithm identifier 212, a secure hash of the other fields in the certificate, and a digital signature of that hash. When a certificate has been issued and signed by the same entity, that certificate is known as a self-signed certificate or a root certificate. In a certificate chain or chain of trust, a root certificate is always at the top of the chain and is used to validate each of the other lower certificates in the chain. As will be appreciated, a certificate chain of trust is a sequence of certificates, each one of which is signed by the next in order until the last one, or root certificate, is self-signed. A trusted third-party, such as Verisign™, that issues digital certificates used to create digital signatures and public/private key pairs is known as a certificate authority or CA. As can be seen from the foregoing, to implement PKI each system element in the distributed network requires a unique digital certificate and associated private key.

In a typical application, a computational component receives a digital certificate by interacting with a certificate authority. The computational component generates a public/private key set and makes a certificate request to the certificate authority. Secure distribution of the private key is not an issue because no distribution is needed (the private key is generated on the target system element). However, this approach is not practical in many cases, since it requires direct communication between the computational component and a certificate authority. This approach also presents security issues, since the certificate request sent from a given computational component can be difficult to validate. If the certificate is granted without sufficient validation, the security that the certificate provides is compromised. More thorough validation is time consuming and potentially expensive.

This problem is compounded in an enterprise network including multiple system elements. Providing each system element with a unique certificate and key pair can be a challenge. There are two key questions that must be addressed. First, how does one get the digital certificate to each system element in the first place? Second, if this is done remotely how does one know that the system element on the other end is the system element that it claims to be? The potential solutions include (a) adding unique credentials at the time of manufacture; (b) staging the equipment to add unique credentials; (c) shipping the credentials separately (e.g., on a crypto-token device such as a smart card or other hardware or media; (d) employing a hardware device (e.g., circuit board) whose personality is or can be made unique; (e) providing access to a secure web site from which credentials can be obtained after suitable login and authorization; and (f) hand carrying the credentials to the device on site.

Each of the solutions typically requires some pre-association of credentials with a specific system element. Such an association is not always possible and/or is expensive. For example, such an association is often not possible until an electronic address, such an IP address, is assigned to the system element, which is not commonly done until after connection to the network. Moreover, encoding unique credentials into a system element at the time of manufacture is costly, and the credentials can be viewed by a skilled computer technician and are therefore not tamper proof. The solutions further require involvement of trained technical personnel, which is not only expensive but also can delay significantly the provisioning process.

In options (c) and (f) above, providing the credentials to the device on site, such as using a crypto-token, can be problematical. Because this technique requires a prior association between a specific hardware or software product and a specific crypto-token, providing wrong credentials with a product or misplacement of the credentials can prevent the product from being provisioned and/or licensed until the proper credentials have been provided. This may be time consuming and expensive particularly if the proper credentials have been lost or misplaced and must be recreated.

SUMMARY OF THE INVENTION

These and other needs are addressed by the various embodiments and configurations of the present invention. The present invention is directed generally to the use of a generic crypto-token to provide credentials, such as digital certificates and private/public key pairs, to a computational component in a distributed processing network. As used herein, a "credential" refers to a set of information (e.g., a unique character or string of characters) which must be provided to a computational component for access to information in that or another computational component to be provided. Examples of credentials include digital certificates, private/public key pairs, and cipher text and plain text messages.

In a first embodiment of the present invention, a process for providing credentials to a computational component in a distributed processing network is provided that includes the steps of:

(a) generating a plurality of crypto-tokens, each crypto-token including a unique identifier and a public/private key pair;

(b) engaging the selected crypto-token with the computational component, whereby the computational component and selected crypto-token can electrically communicate with one another; and (c) based on a digital certificate comprising the public key and unique identifier and private key in any of the crypto-tokens, establishing a secured communication session with the computational component. Before step (c), any of the plurality of crypto-tokens may be engaged with the computational component to establish the secured communication session.

The crypto-tokens can be any human portable medium for storing or otherwise providing credentials. Preferred crypto-tokens include integrated circuits such as smart cards and dongles.

In one configuration, generic host independent certificates are used to establish an initial secure link and thereafter made unique (after installation) rather than the current practice of generating a host associated certificate before installation. "Uniqueness" can be effected using a customer- or enterprise-specific or computational component-specific certificate. In the former case, the certificate uniquely identifies the enterprise but not a specific computational component in the enterprise (apart from the component's public key and corresponding token identifier included in the certificate). In the latter case, the certificate uniquely identifies the computational component, and optionally the enterprise, by including appropriate unique identifier(s) in the certificate. A manufacturer or supplier of a computational component generates a stock of crypto-tokens, preferably smart cards. Each crypto-token is unique from the other crypto-tokens; that is, each token contains a unique private cryptographic key along with a unique identifier (e.g., a serial number and name associated with the token). The identifier is within the token and also printed on the outside of the token. The certificate in the token is signed digitally using the private key corresponding to a root certificate of the manufacturer or supplier or of any recognized Certificate Authority, such as Verisign™.

A token is shipped with each computational component from the manufacturer or supplier. Because the tokens are generic and not tied specifically to a computational component, customer, or enterprise network, any token can accompany a selected computational component. Stated another way, the token has no value until a license file and/or provisioning system data structure authorizes its use for a specific enterprise/customer/computational component. Maintenance centers can also have a supply of the tokens. When the computational component arrives at the customer's site, the customer plugs the component into a power source and the enterprise network and inserts the token into the token reader or other type of driver. The computational device obtains an IP address from an address server as well as an IP address of the customer's central provisioning server. The token permits the device to contact the central provisioning server via an encrypted link and authenticated after encrypted, i.e., encrypted and authenticated link. The provisioning server can be assured that it is communicating with the token identified by the certificate exchanged in the secured link because the certificate was signed digitally by the manufacturer/supplier. The manufacturer's/supplier's root certificate is resident on the provisioning server or can be obtained from the manufacturer's/supplier's public Web site. The token is thus securely identified and authenticated to the provisioning server. Administration of the provisioning server allows it to know whether to accept or deny this new device based on the token identifier in the certificate. Once accepted, the provisioning server can perform what ever initialization tasks are required, such as sending data needed by the device, changing its IP address, causing it to reboot or come on line, installing software updates or upgrades, etc.

The administration of the provisioning server can be accomplished ahead of time, knowing that a number of tokens are coming or on demand, via a call from the person plugging in the new device. The information transmitted typically includes at the very least the token's identifier.

There are a number of options to this configuration. If there is no address server, the customer could be prompted for this information which their network administrator would have to supply. If on-line access to the manufacturer/supplier is available, a secure link between the token and the provisioning server of the manufacturer/supplier is possible. The provisioning server can communicate directly with the token and change its data through an encrypted link directly to the token. For example, a license could be stored or updated in the token or the certificate itself could be changed.

The present invention can represent a significant cost and time savings during the provisioning process. Currently, to create a digital certificate a request is made from an installed computational component to a certificate authority, such as Verisign™, to request a certificate. The request must include a hostname of the requesting computational component. This can only be known after installation and may require the certificate to be reissued if the name changes. Assuming that the request is approved, the certificate is returned to the computational component a day or so later. The process of the present invention can avoid this delay and dependency on a third party during installation. The use of a generic certificate in the token, or a certificate that contains a random identifier, rather than the hostname of the computational component allows the certificate and token to be generated in advance and therefore can eliminate the delay in installation and the dependency on hostname assignments. Lost or damaged tokens can be exchanged freely for tokens having different identifiers, key pairs, and generic certificates but being freely interoperative with an already deployed computational component. Additionally, the standard or generic certificate can be later updated over a link (whether or not secure) to contain a network host name for the computational component. Thus, network failures or problems due to computational components attempting to register or otherwise communicate with system elements in a different network area or region can be prevented by replacing the generic certificate in the token with a device-specific certificate including not only a hostname but also an enterprise area, or region identifier, module identifier, and/or system identifier.

The use of a token and a customer-provided address server, which can give a computational component in an enterprise network both its own address and the address of a provisioning server, can be a very simple solution to the complex problems of securely provisioning enterprise network elements. It can allow secure installation, identification, and authentication of computational components in a network without the installers needing to know any "secret" information. It therefore permits relatively unskilled, nontechnical customer personnel to install computational components on site without requiring the assistance of technicians from the manufacturer/supplier. This can not only allow faster installation service for the customer but also represent a substantial cost savings to the manufacturer/supplier. Furthermore, this approach affords the administrator final authorization of computational components which possess authenticated tokens.

The identification afforded by tokens is portable. If a computational component fails, the token is moved to the maintenance replacement without delay. The token cannot be duplicated and therefore the service being granted by the token cannot be duplicated. A customer (or hacker) can not operate a second computational component from the same token, thereby avoiding payment of a fee to the manufacturer/supplier. In cases where there is an on-line link to the provisioning server of the manufacturer/supplier, the protection of the token allows the inclusion of licenses in the token in a secure manner so that the license is likewise portable with the token during maintenance replacement.

Tokens, such as a smart card, can maintain desired credentials secret and prevent their unauthorized discovery and/or modification. Integrated circuits can be configured to process input and provide output but have their stored content be otherwise inaccessible to outside devices.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Provisioning Architecture

Figure 1:
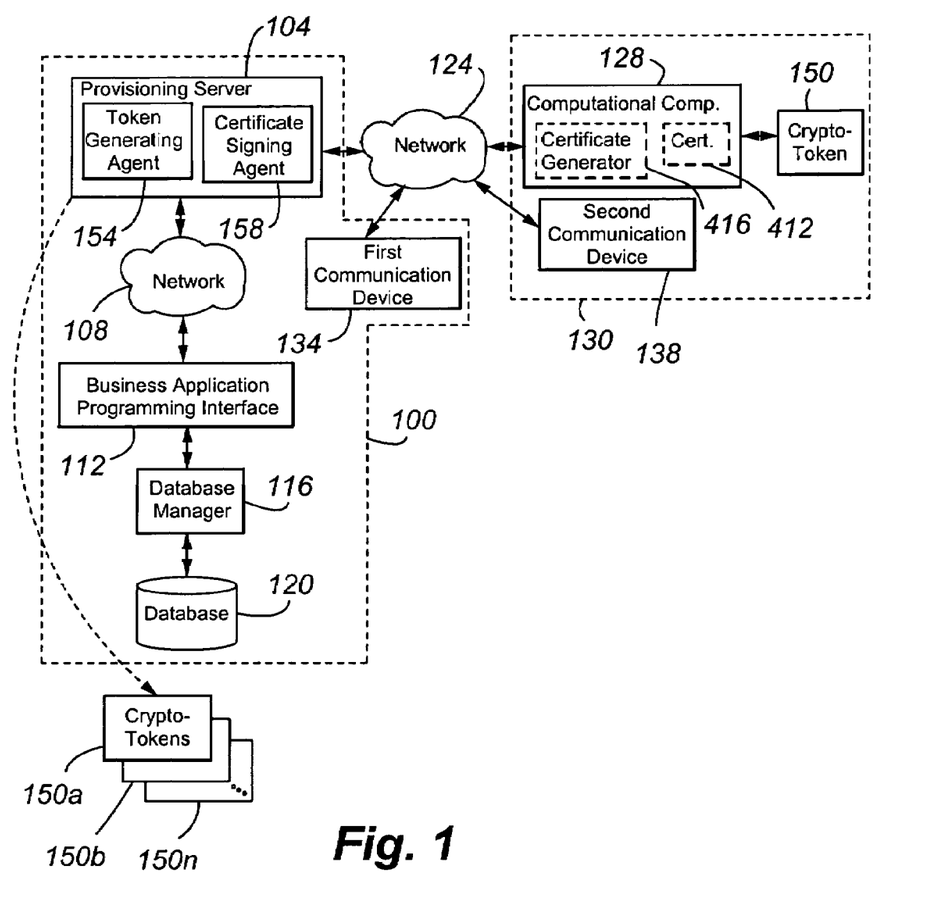
FIG. 1 is a block diagram of a provisioning architecture according to an embodiment of the present invention.

Referring to FIG. 1, the provisioning system 100 includes a provisioning server 104 connected by via a network 108 and business application programming interface 112, to a database manager 116. The database manager 116, in response to queries and commands from the other provisioning system 100 components and/or based on predetermined rules or policies, adds, updates, modifies, and validates records in the database 120. The database 120 typically includes product and associated customer information, such as product (or computational component) serial numbers and other product identifiers, customer identifiers, material codes, and the like, to a computational component 128 to be provisioned. The manager 116 can be any suitable enterprise resource planning software, such as ERP or Enterprise Resource Planning™ software sold by SAP.

The provisioning server 104 includes a certificate authority or signing agent 158 for signing certificates with a private key corresponding to a public key in a certificate of the provisioning system 100 and a token generating agent 154 to supervise the production of tokens.

The provisioning system 100 is connected via network 124 with an enterprise network 130 including a computational component 128 to be provisioned. The computational component 128 can be any hardware device and/or software module, such as an application program, a server, a receiver, a transmitter, an appliance (a computational component delivered as a "black box" for a dedicated purpose), and the like. As will be appreciated, the provisioning system 100 may also be a part of the enterprise network 130.

The networks 108 and 124 can be wired and/or wireless and packet-switched and/or circuit-switched. Typically, network 108 is a local area network while network 124 is a wide area network, such as the Internet.

Administration personnel in the provisioning system 100 and enterprise network 130 are in communication with one another via the first and second communication devices 134 and 138. The communication devices 134 and 138 may be any suitable communication device, whether wired or wireless or packet- or circuit-switched, such as analog or digital telephones, IP hardphones, IP softphones, and the like. Although FIG. 1 depicts the first and second communication devices 134 and 138 as being interconnected by the network 124, it is to be understood that the devices 134 and 138 may be interconnected by a separate and different network.

Figure 4:
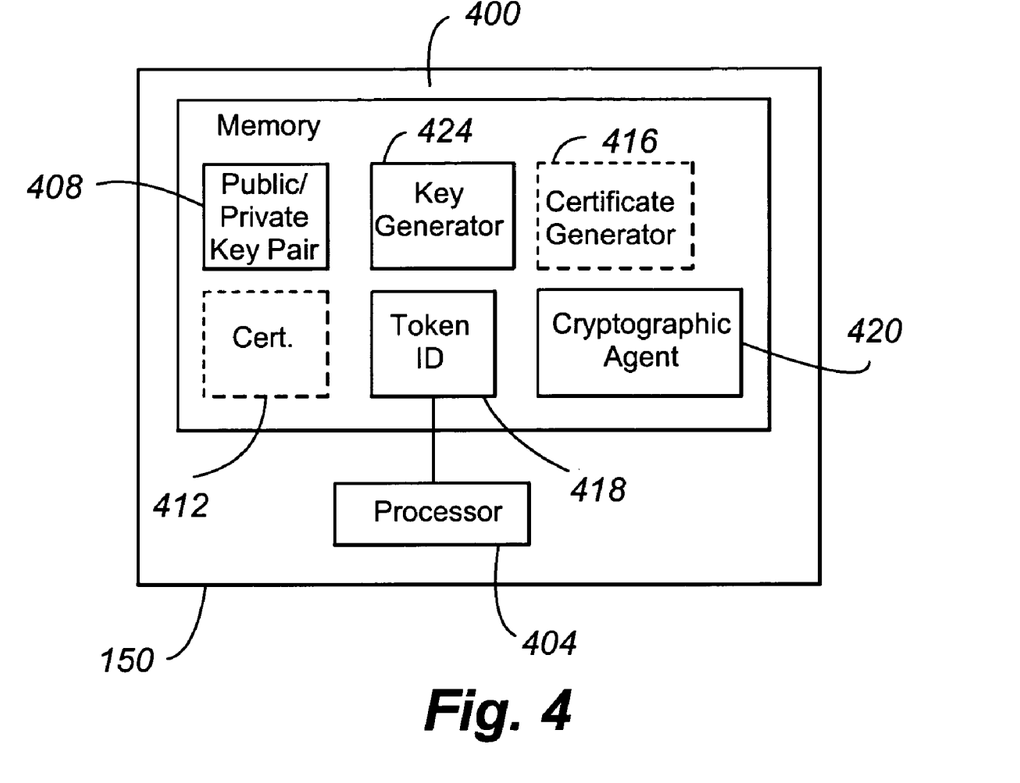
FIG. 4 is a block diagram depicting a crypto-token according to an embodiment of the present invention.

The provisioning process includes the use of a plurality of crypto-tokens 150a-n. An exemplary crypto-token 150 is shown in FIG. 4. The crypto-token 150 includes a memory 400 and processor 404. The memory 400 is read-or-write memory, such as EEPROM, flash EEPROM, FRAM, and RAM, or read-only or ROM memory. The processor is preferably a microprocessor. The crypto-token can be any suitable portable device, such as a smart card (e.g., an Integrated Circuit (IC) microprocessor card, Integrated Circuit (IC) memory card, and an optical memory card), a (USB) dongle, and the like.

The memory 400 includes a public/private key pair 408, a unique token identifier or ID 418 (which is a randomly generated variable that may be numeric, alphabetical, or alphanumeric), optionally a (typically non-signing) generic certificate 412 (which does not include the private key 408 but does include the public key 228), a key generator 424 for generating public/private key pairs, optionally a certificate generator 416 for generating a token ID 418 and certificate requests, which include unsigned certificates, and a cryptographic agent 420 for encrypting plain text and decrypting cipher text using the private key 408. The token ID 418 is in typically in the subject field 224 of the certificate.

Figure 3:
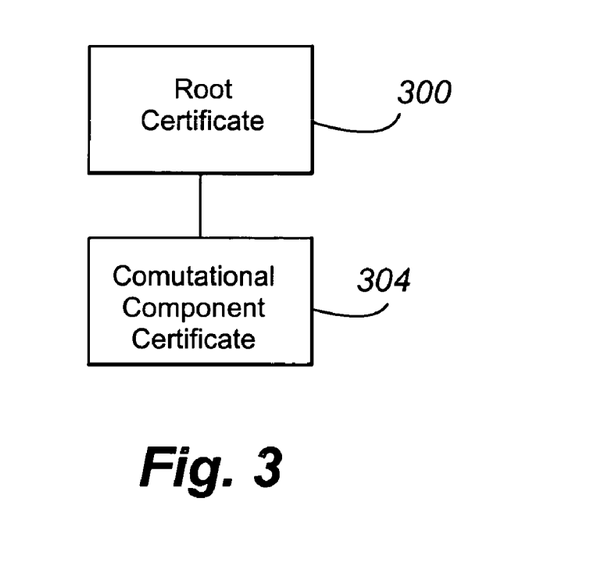
FIG. 3 depicts a chain of trust according to an embodiment of the present invention.

When the crypto-token 150 is manufactured by the provisioning system 100 and at the time of shipping of the computational component 128, the crypto-token is not associated with a specific computational component (including the component 128), customer, or enterprise network, thus, any crypto-token can be used with any computational component, customer's computational components, or enterprise network's system elements in steps 508, 512, and 516 discussed below. In other words, the standard 202 and extensions 232 portions of the certificate do not identify a specific computational component to which the certificate corresponds (e.g., the certificate does not include a host name, electronic address, or other unique identifier of a specific computational component). Although the certificate uniquely identifies the corresponding crypto-token, the certificate 412 is generic in that it can be used by any computational component for purposes of authentication, such as in a Transport Layer Security or TLS Protocol handshake procedure. The provisioning system's association between the token and a specific computational component is preferably effected during or after installation of the component in the enterprise network. The certificate 412 is digitally signed by the certificate authority 104 (using the private key of the certificate authority 104). The memory 400 can includes not only the generic certificate 412 but also a copy of the issuing certificate authority certificate (not shown) issued to and signed by the certificate authority 158. With reference to FIG. 3, a typical chain of trust is depicted, such as is included in the token. The chain includes the certificate 300 of the root certificate authority at the top of the chain, certificate(s)' (not shown) of all intermediate certificate authorities, and a computational component certificate 304 at the bottom of the chain.

To permit identification of the token by personnel, the token ID 418 is typically printed on the outside or exterior surface of the token. The token is typically packaged with the computational component prior to sale or delivery to the customer. However, technical personnel may also hand carry the token to the customer's site when the computational component is provisioned.

In a preferred embodiment, the crypto-token is used not only for provisioning and/or licensing but also for verifying proper operation of the computational component and other applications requiring security. In applications for ensuring proper operation when the crypto-token is removed from the internal or external drive of the computational component during component operation, the computational component will, after a selected time interval and/or after a link between the component and another component goes off line, automatically go off line until the crypto-token is re-inserted into the drive. This requirement prevents the unlawful or impermissible replacement of the provisioned and licensed computational component with an unprovisioned and/or unlicensed computational component.

The Provisioning Process

Figure 5:
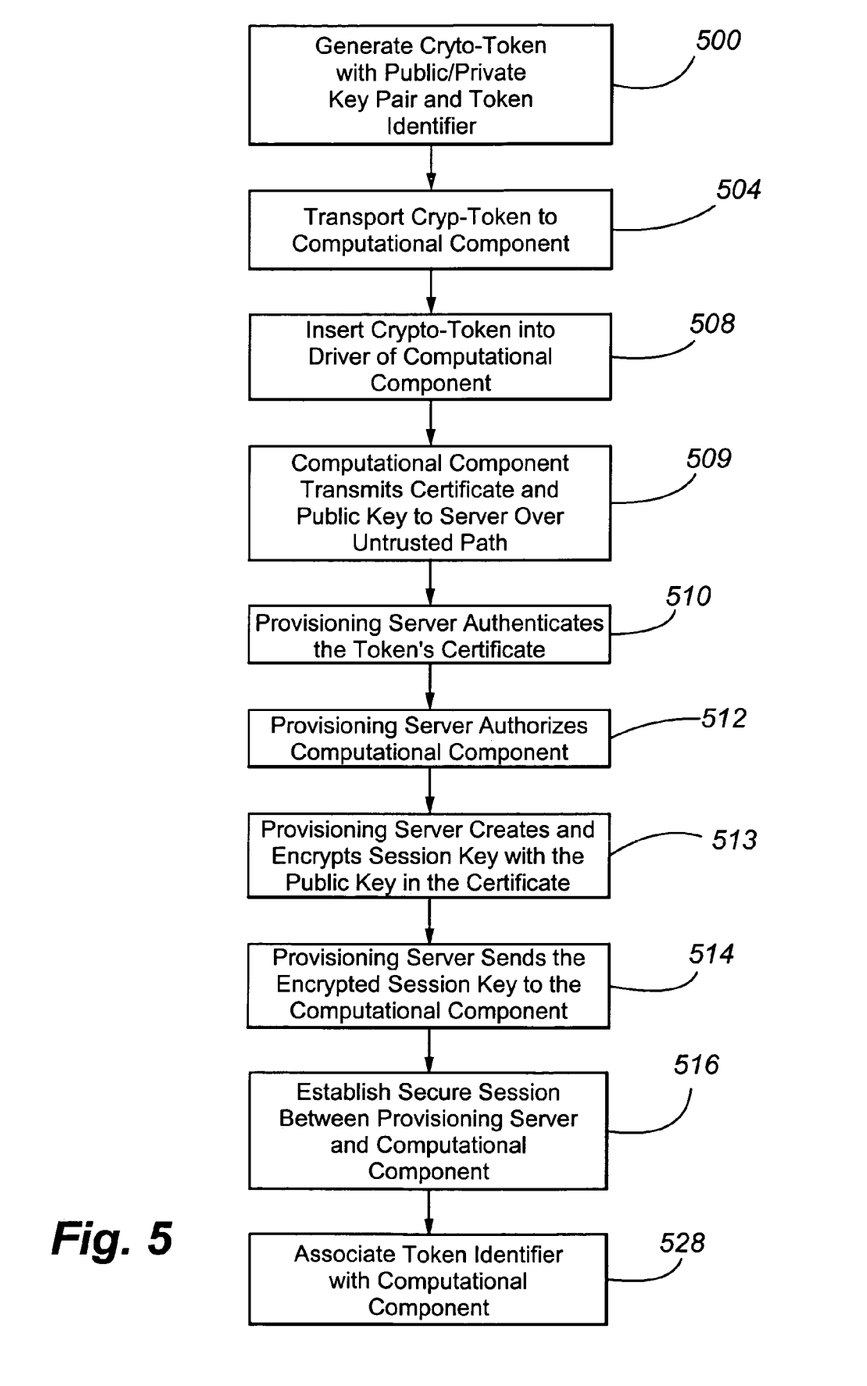
FIG. 5 is a flowchart depicting a provisioning process according to an embodiment of the present invention.

Referring now to FIG. 5, the provisioning process will now be described.

In step 500, the provisioning system 104 generates a plurality of crypto-tokens 150a-n, each including a unique public/private key pair, unique token identifier, and a digital certificate incorporating the unique token identifier and the public key in the respective key pair.

A process for manufacturing a typical crypto-token includes a number of steps. The token generating agent 154 determines to produce N tokens with sequence numbers 1 to N. The agent 154 prompts the operator/user to insert a blank token 150 in a token reader (not shown). The token is assigned the token identifier "X", where X is between 1 to N. X is selected by the token generating agent 154 not by the token 150. The token 150 generates a public and private key pair. The private key 408 is not known to the provisioning system 100 before, during, or after the manufacture of the token 150. The system 100 prints an appropriate label on the token, ejects the token 150 and records in the database 120 (via the database manager 116) the fact that the token was generated. The printed label typically includes the common name of X.

In step 504, one of the tokens 150 is transported to the customer's site to be used in provisioning the computational component 128.

In step 508, the computational component is connected to the network 124, plugged in to a power source, and the token 150 plugged into an internal or external driver in communication with the computational component. As part of the connection process, the computational component is assigned an electronic address, such as an IP address.

In step 509, the computational component transmits a generic digital certificate to the provisioning server 104 over an untrusted path. In step 510, the provisioning server 104 authenticates the token's generic digital certificate. Once the certificate has been validated, the provisioning server in step 512 authorizes the computational component via the application interface 112, data base manager 116, database 120 and the subject 224 (token ID 418) and other fields in the received certificate. After successful authentication, the agent 158 creates a random session key (step 513), and encrypts this key with the public key from the generic certificate received from the computational component. In step 514 the provisioning server sends the encrypted session key to the computational component.

In any of the preceding steps, an entity, whether human or automated, forwards the token ID 418 corresponding to the token 150 communicating with the computational component 128 and optionally a unique identifier in the enterprise network 130 (e.g. a serial number, an electronic address, a device name, and the like) of the computational component 128 to the provisioning server 104. This information is typically communicated out-of-band and not transmitted as part of the handshake procedure. For example, the information may be communicated out-of-band using the first and second communication devices 134 and 138. Until at least the token ID 418 is received by the provisioning server 104, the provisioning server 104 does not know whether or not it is proper to proceed further with the computational component 128 and, if so, what database information corresponds to the computational component currently engaged with the identified token.

Alternatively, the token ID 418 may be pre-programmed in the server 104. (That is in the database 120 and accessed by the provisioning server 104 through network 108, business application 112 and database manager 116 as previously described.)

In step 516, the computational component establishes a secure session with the provisioning server 104 using the received session key. A two way authentication occurs in this process. As will be appreciated, in a TLS handshake procedure the computational component and provisioning server exchange their respective digital certificates and the session key encrypted with their respective public keys so that each side may authenticate the other side. Authentication quality requires each of the components verifying the other component has a valid certificate (by verifying that the certificate was signed by the certificate authority) and that the digital signature is valid.

During session establishment, the computational component encrypts messages using the public key of the provisioning server; the provisioning server, upon receipt of such message decrypts it with the provisioning server's private key. Similarly, the provisioning server encrypts messages using the public key of the computational component (received in the generic certificate of the computational component); the computational component, upon receipt of such message decrypts it with the computational component's private key.

Once the session is established, each side encrypts and decrypts messages using the secret session key exchanged during session establishment.

As will be appreciated, a number of messages are commonly exchanged in this step. Examples can include the Alert, ApplicationData, Certificate, CertificateRequest, CertificateVerify, ChangeCipherSpec, ClientHello, ClientKeyExchange, Finished, HelloRequest, ServerHello, ServerHelloDone, and ServerKeyExchange messages. The various messages can include security protocol version information, a random number used to seed the cryptographic calculations, session ID, cipher suites, compression methods, and public key information.

In step 528, the token's corresponding identifier 418 (e.g., X) is used to obtain provisioning information from the data base 120 through the data base manager 116 and application interface 112. This information is used to provision the computational component via the secure session established in 516.

As can be seen from the foregoing discussion, during the provisioning process, a number of manual steps are performed to lock the computational component and the crypto-token together logically. Thereafter, two-way authentication can be performed without human involvement. In other words, the computational device has a real identity that can be trusted by the provisioning server and other computational devices communicating with the provisioned computational component.

Figure 8:
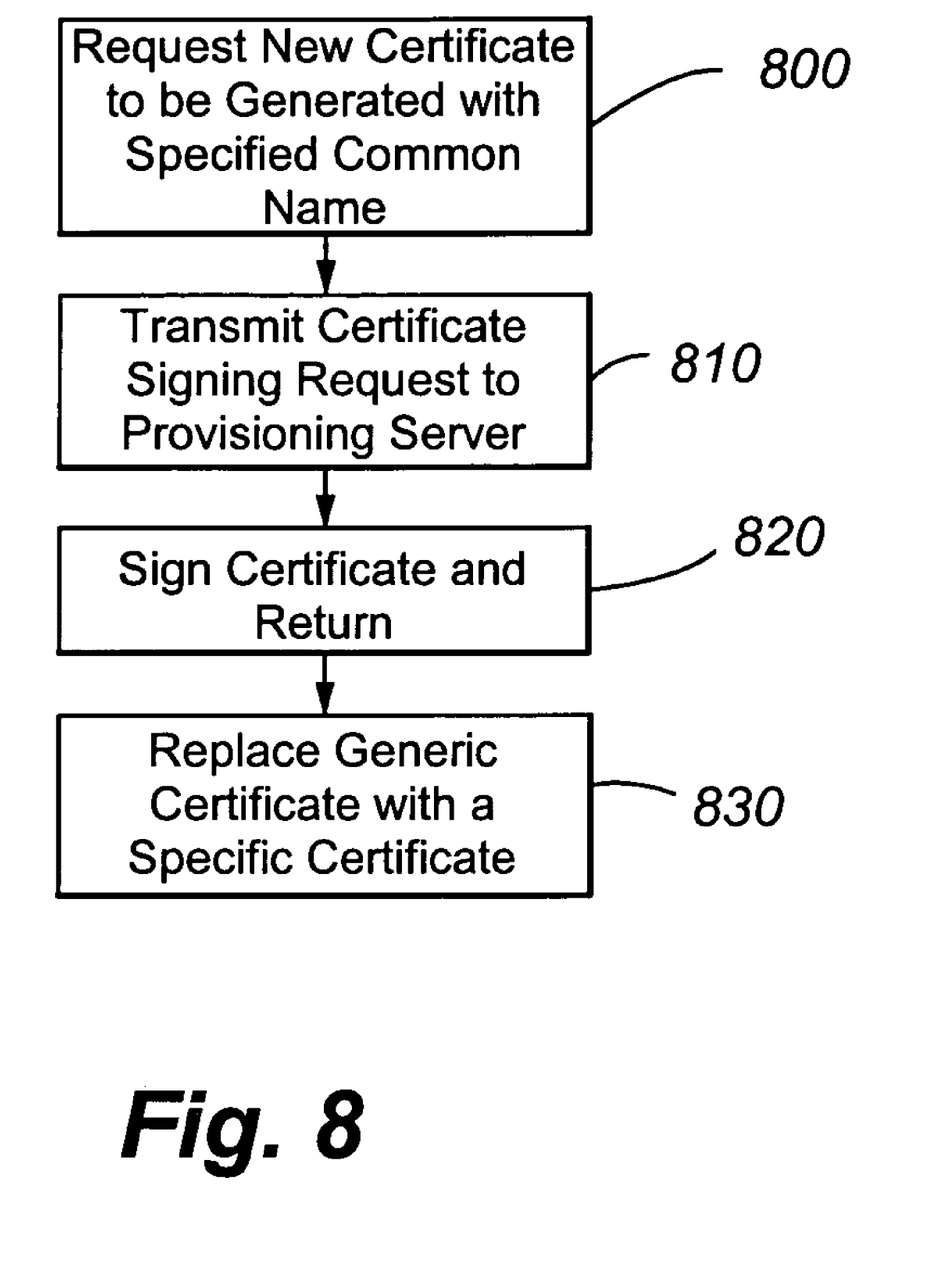
FIG. 8 is a flowchart depicting a provisioning process according to another embodiment of the present invention.

A second variation of the invention is illustrated in FIG. 8. Following the steps 500 through 528, the provisioning server 104 can replace the generic certificate in token 150 with a specific certificate that reflects the computational component's true identity or role in the network.

In step 800, using the secure session established in 516, the provisioning server 104 instructs the computational component 128 to generate a certificate signing request with a specified common name. This name might include the host name or fully qualified domain name of the computational component, an ESID, SID, PID, MID for the computational component, or other values as may be useful in the context in which the computational component operates.

In step 810, the certificate signing request is transmitted to the provisioning server 104 using the secure session 516.

In step 820, the provisioning server signs the certificate request and returns the signed certificate to the computational component 128 and crypto-token 150.

In step 830, the crypto-token replaces the generic certificate 412 with the specific signed certificate received through the secure session 516 from the provisioning server 104.

As will be appreciated, the new certificate can be constructed to use the same public/private key pair 408 or a new public/private key pair.

Thereafter, computational component 128 can be identified directly by the information 224 and other fields in its new certificate directly and without a look-up in data base 120. That is, without having to translate between a generic token ID and the true identity of the computational component.

As will be appreciated, it is also possible that the original crypto-token 150 does not contain a digital certificate, but only a public/private key pair and a token ID. In this case the public/private key pair is used to establish a secure session 516 but without the use of digital certificates or using only the certificate of the provisioning server. This secure session can then be used to create a specific certificate for the computation component using the procedures 800-830.

Figure 6:
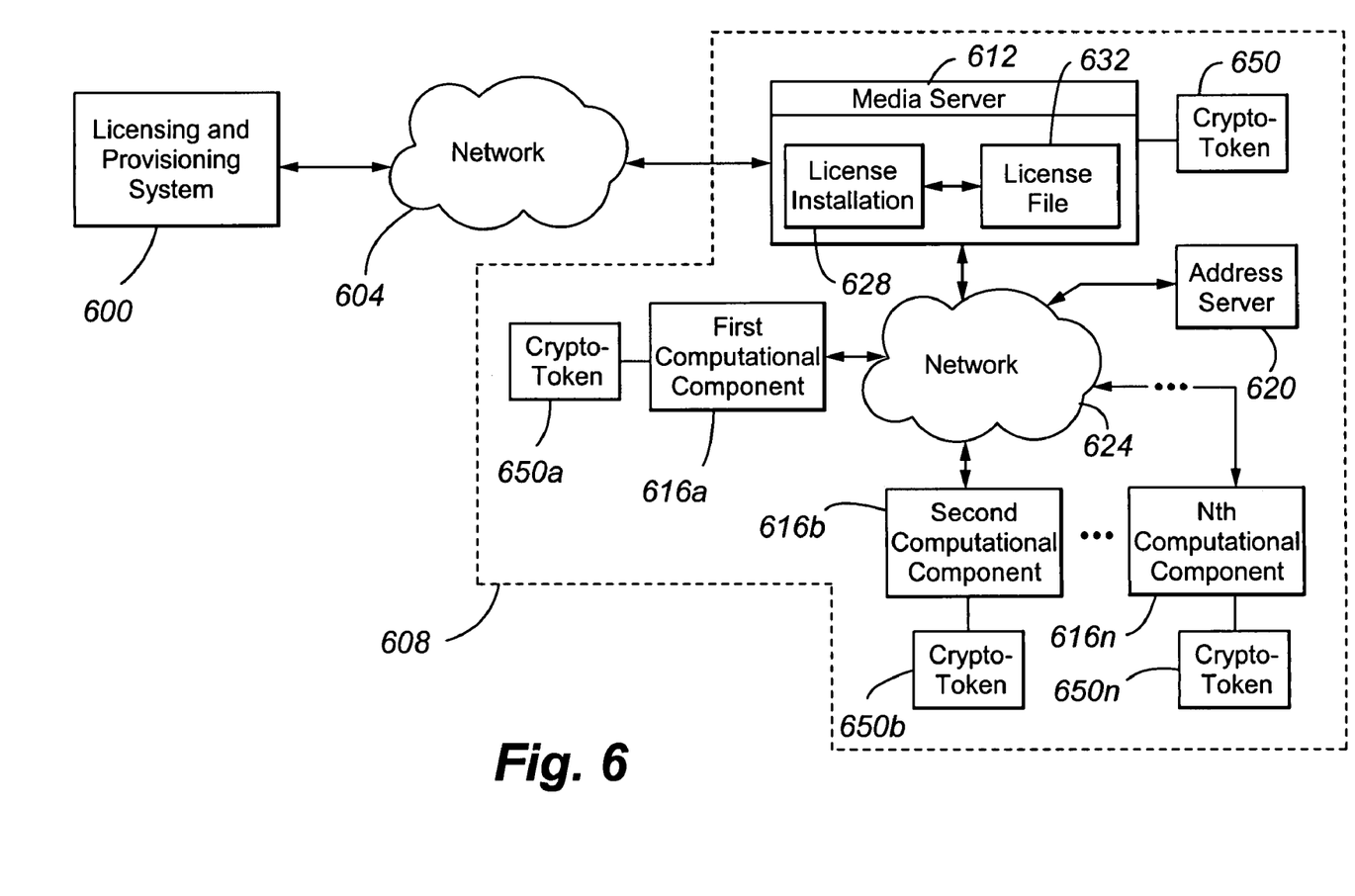
FIG. 6 is a block diagram of a telecommunications licensing and provisioning architecture according to an embodiment of the present invention.

Architecture for Provisioning and Licensing a Telecommunications Enterprise Network Using the principles set forth above, an architecture for provisioning and licensing a telecommunications enterprise network will now be discussed with reference to FIG. 6. The licensing and provisioning system 600 is connected with an enterprise network 604 by way of network 608. The various processing components of the licensing and provisioning system 600 are discussed in detail in the copending applications referenced above. The system 600 includes the token generating agent 154 and certificate signing agent 158 of FIG. 1. The enterprise network 608 includes media server 612, first, second, . . . nth computational components 616*a-n*, and an address server 620 (such as a server configured as defined in the Dynamic Host Configuration Protocol), all interconnected by a network 624.

The media server 612 can be any telecommunication switch or server, such as an S8700™, S8300™, and S8300™ media server running the COMMUNICATION MANAGER™, all of which are sold by Avaya Inc.

The first, second, . . . nth computational components can be a device, such as media servers serving a variety of functions (e.g., spare processors), gateways, port networks, voice messaging systems, email servers, and instant messaging servers.

The networks 604 and 624 can be packet-switched and/or circuit-switched. Typically, network 624 is a local area network while network 604 is a wide area network, such as the Internet.

The media server 612 includes a license installation agent 628 that forwards a license file 632 to the various computational components. The license file defines the enterprise features and feature capacity allocations for the enterprise network 608.

As will be appreciated, during the transmission of licenses to the various computational components 616 and later communications between and among the computational components (including the media server) and with the licensing and provisioning system 600, it is important to provide adequate security to prevent spoofing and other security breaches. Preferably, each of the computational components has a unique, respective, digital certificate and public/private key pairs. The provision of digital certificates and public/private key pairs is effected by the use of the crypto-tokens 650a-o using the techniques discussed above. Before or after the PKI information has been transferred to a computational component, the pertinent licensing information may be provided to it.

The crypto-tokens 650 are identical to the crypto-token 150 of FIG. 4 except that the chain of authority may include additional certificate(s) between the root certificate 300 and the token certificate 412. The additional certificate(s), which can be included in the token's memory 400 for reasons of security, is that of a license generating module in the licensing and provisioning system 600. The licensing and provisioning system's private key, which corresponds to the public key in the additional certificate, digitally signs the generic crypto-token's certificate. This chain of trust would greatly facilitate and expedite the provisioning and licensing process as the media server, first computational component, and/or crypto-token could communicate directly with the license generating module rather than the certificate authority—which would in turn communicate with the license generating module. This is particularly advantageous for the crypto-token as no intermediate node in the enterprise network or enterprise administration could view what is in the encrypted message addressed to the token, thereby preventing tampering with the transmitted information.

A database (not shown) maintained by the licensing and provisioning system 600 comprises a plurality of records corresponding to hardware (e.g., processors or IP services interface cards) sold to customers. In particular, the database typically includes a serial number, serial number status or licensing state, client or purchaser, material code(s) (e.g., a material code in SAP that defines the hardware having the serial number), an Enterprise System ID or ESID that identifies uniquely the enterprise that is the subject of the record, a Module ID or MID that identifies a module in the associated enterprise record, and a System ID that identifies a system in the associated enterprise record. A media server is identified uniquely by the combination of SID and MID. The order database comprises a plurality of records associated with hardware and software corresponding to each customer order. Each order entry typically includes an order number, customer name, address, and contact information, and a series of quantity, material code, and description fields identifying the contents of each order. The databases and data structures are further described in copending U.S. patent application Ser. No. 10/232,906, filed Aug. 30, 2002, entitled "Remote Feature Activator Feature Extraction", which is incorporated herein by this reference.

Process for Distributing PKI Information and Installing License Files

Figure 7:
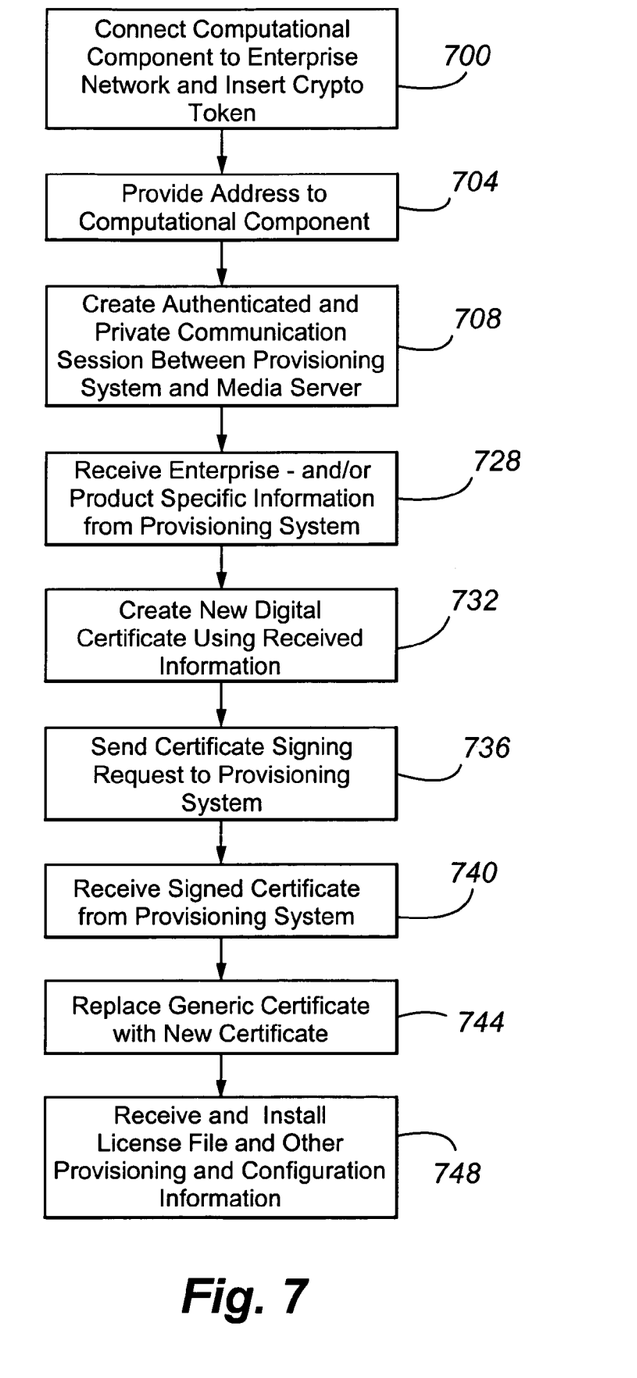
FIG. 7 is a flowchart depicting a license and provisioning process according to another embodiment of the present invention.

The process for distributing PKI information to each of the first, second, . . . nth computational components will now be described with reference to FIG. 7. FIG. 7 assumes that the PKI information and license file 632 have previously been provided to the media server 612 by the licensing and provisioning system 600. The PKI information is preferably provided using the crypto-token 650o such as using the process of FIG. 5. After the PKI information has been installed, the license files can be provided by the licensing and provisioning system 600 using a trusted and secure pathway.

In step 700, the first computational component 616a is unpacked, a crypto-token 650a inserted into an internal or external drive of the computational component, and the component 616a connected to a power source and the network 624. It is then turned on.

In step 704, during boot-up the first computational component 616a forms a host name from the component's serial number or other identifier, contacts the address server 620, and obtains an electronic address, typically an IP address and/or the address of the system 600 and/or media server 612. In one configuration, the component 616a forms the hostname using the unique identifier 418 of the crypto-token inserted in the drive.

In step 708, an authenticated and private communication session is created between the provisioning system and the computational component 616. The process for creating this session is described above in connection with steps 509 through 516. After this step, the system 600 or media server 612, depending on the entity responsible for administering the first computational component, may register the component and reboot the component after registration is completed to place the component in service.

The information communicated out-of-band to the provisioning system 600 and/or administration personnel at the media server 612 typically includes both the token ID 418 and information identifying uniquely the first computational component 616 on the network 608. If the information is not provided before the initial communication of the first computational component with the media server is made, an alarm will be triggered that will ultimately require the transmission of the identification information. The information is typically transmitted by a shipping clerk at the time of shipment of the first computational component, by the technician when the specific crypto-token to be used for provisioning is selected, or by the installing technician in response to an alarm triggered during installation of the first computational component.

In step 728, the media server 612 forwards a request from the first computational component 616a for and receives from the system 600 enterprise- and/or product-specific information so that the certificate generating agent in the computational component 616 can create a new certificate. The requested information, for example, can include the name and/or serial number of the first computational component and/or the ESID, SID, and MID associated with the first computational component.

In step 732, the certificate generating agent in the computational component 616 is provided with the enterprise- and/or product-specific information and generates a new certificate request, which is unique to the first computational component. The expiration date of the certificate request is typically the expiration date of the license. The certificate request includes the enterprise- and/or product-specific information. The certificate request not only identifies the first computational component uniquely within the enterprise network 608 but also identifies uniquely the first computational component with respect to other computational components in networks touching the enterprise network 608. For example, the certificate request may include a serial number uniquely identifying the component 616.

The various fields in the certificate request may be populated completely by the generator using information provided by the computational component 616 and/or provisioning system 600. Alternatively, the fields may be partly populated by the generator and the computational component 616 with the remainder of the fields being populated by the system 600 using information received from the database manager 116. In either event, the new certificate includes information unique to the computational component rather than simply information unique only to the token.

In step 736, the computational component forwards a certificate signing request including the new certificate request (which is unsigned) to the media server 612, which forwards the request to the system 600. The certificate signing agent 158, using the private key of the token 650, signs the certificate request. It then returns the signed certificate to the component 616.

In step 740, the signed certificate is received by the media server 612 and forwarded to the first computational component 616a. The first computational component 616a replaces the generic certificate with the signed certificate.

In step 748, the first computational component 616a receives from the media server 612 and installs the license file(s) and other provisioning and configuration information.

These steps are repeated for each of the other second . . . nth computational components 616b-n to provision/configure the various functional components in the enterprise network 612.

A number of variations and modifications of the invention can be used. It would be possible to provide for some features of the invention without providing others.

For example in one alternative embodiment, the various modules referenced herein are implemented as software, hardware (e.g., a logic circuit), or a combination thereof.

In another alternative embodiment, the division of the various functions performed by the various modules in the authentication file system are different.

In another embodiment, the present invention is not limited to licensing and/or provisioning activities. As will be appreciated, the present invention can be used to convey a digital certificate and private/public key pair to any computational component for any purpose and in any application. For example, the present invention can be used to provide PKI information to a personal computer or laptop in connection with e-commerce. It can be used to change PKI information on a computational component that has potentially been compromised.

In yet another embodiment, the dispensed private/public key pair can be used to validate a provided license. As will be appreciated, serial numbers or other unique identifiers are used in the above-referenced patent applications for license validation. In this embodiment, no serial numbers or other unique identifiers are required for license validation. Rather, the system 600 generates an enterprise master license, determines a hash value over the license contents. The private key of the system 600 then encrypts the hash value in the form of a digital signature in or appended to the license file. The license can then be provided to the remote media server 612 in the enterprise network. The crypto-token 650o in communication with the server 612 uses the public key in the certificate of the system 600 to decrypt the digital signature while the server determines the hash value of the license file. If the decrypted signature and the determined hash value match, the server knows that the license file has not been tampered with or otherwise altered. This approach may also be used with the server 612 being the allocation license file generator and the various computational components being the recipients of the generated allocation license files.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing credentials to a computational component in a distributed processing network, comprising:

generating a plurality of crypto-tokens, each crypto-token comprising a unique identifier and a public/private key pair and being configured for operative engagement with a selected computational component, whereby the selected computational component and a selected crypto-token can electrically communicate with one another;

receiving a unique identifier for the selected crypto-token; and based on (i) a digital certificate comprising the public key and unique identifier and (ii) the private key in the selected crypto-token, establishing a secured communication session with the selected computational component to which the selected crypto-token is engaged, wherein any of the plurality of crypto-tokens are interchangeable such that any of the crypto-tokens may be engaged with the selected computational component to effect the establishing step, wherein, in the generating step, each crypto-token is not associated with a specific computational component and/or user, and wherein the unique identifier is received out-of-band from the digital certificate.

2. The method of claim 1, wherein the selected crypto-token comprises the digital certificate, wherein standard and extension portions of the digital certificate, before the establishing step, do not identify a specific computational component, wherein the digital certificate identifies uniquely the corresponding cryto-token, and wherein, before the establishing step, each crypto-token is not associated with a specific computational component, enterprise network, and user.

3. The method of claim 2, wherein the digital certificate in each crypto-token comprises the corresponding unique identifier of the crypto-token, wherein the digital certificate in each crypto-token excludes a unique identifier of any computational component, and wherein the unique identifier of each crypto-token is visible on the outside of the crypto-token.

4. The method of claim 1, wherein a provisioning system performs the generating and establishing steps and, after the receiving step, further comprising:
the provisioning system thereafter associating the unique identifier of the selected crypto-token with the selected computational component, wherein, before the associating step, the unique identifier of the crypto-token is not associated specifically with the selected computational component.

5. The method of claim 1, wherein the plurality of crypto-tokens are not customer-specific any may be used in a computational component purchased by any customer and wherein before each crypto-token is not associated with either a specific computational component, enterprise network, or user.

6. The method of claim 1, wherein the crypto-token is portable and at least one of a smart card and a dongle and wherein the unique identifier of the selected crypto-token is received before or during the establishing step.

7. The method of claim 6, wherein the unique identifier is provided in a communication that is out-of-band relative to the secured communication session.

8. The method of claim 6, wherein the unique identifier is provided over an unencrypted communication channel, wherein the digital certificate is in a chain of authority, the chain of authority including a root certificate of authority of an issuer of the selected crypto-token, an intermediate digital certificate of licensing generating module, and the digital certificate of the selected crypto-token, and further comprising:
determining a hash value over contents of a license file;
encrypting, using a private key of a of licensing system, the hash value;
thereafter transmitting the license file and encrypted hash value to the selected computational component; and
decrypting, by the selected computational component, the hash value using a public key, of the licensing system.

9. The method of claim 1, further comprising before the receiving step:
forming, by the selected computational component, a host name; and
obtaining, by the selected computational component, an electronic address on the network; and further comprising after the establishing step:
generating, by at least one of the selected crypto-token and selected computational component, a new unsigned digital certificate request that comprises information specifically identifying the selected computational component;
forwarding, by the selected computational component, the unsigned digital certificate request to a certificate authority;
digitally signing, by the certificate authority, the new digital certificate request; and
replacing the original certificate specific to the selected crypto-token with the new signed certificate specific to the selected computational component.

10. The method of claim 9, wherein the original and new certificates comprise the same public key.

11. The method of claim 9, wherein the new certificate comprises at least one of an enterprise network identifier, a module identifier, and a system identifier.

12. The method of claim 9, wherein the new certificate comprises at least one of a serial number and host name associated with the computational component.

13. The method of claim 1, further comprising after the establishing step and during the secured communication session:
forwarding a license file to the selected computational component.

14. The method of claim 1, wherein the selected computational component is at least one of a gateway, a media server, a voice messaging server, an instant messaging server, an email server, and a port network.

15. A computer readable medium encoded with processor-executable instructions to perform the steps:
generating a plurality of crypto-tokens, each crypto-token comprising a unique identifier and a public/private key pair and being configured for operative engagement with a selected computational component, whereby the selected computational component and a selected crypto-token can electrically communicate with one another;
receiving a unique identifier for the selected crypto-token; and
based on (i) a digital certificate comprising the public key and unique identifier and (ii) the private key in the selected crypto-token, establishing a secured communication session with the selected computational component to which the selected crypto-token is engaged, wherein the crypto-tokens are interchangeable such that any of the plurality of crypto-tokens may be engaged with the selected computational component to effect the establishing step, wherein, in the generating step, each crypto-token is not associated with a specific computational component and/or user, and wherein the unique identifier is received out-of-band from the digital certificate.

16. The computer readable medium of claim 15, wherein the instructions are further operable to perform the further steps:
generating, by at least one of the selected crypto-token and selected computational component, a new unsigned digital certificate request that comprises information specifically identifying the selected computational component;
forwarding, by the selected computational component, the unsigned digital certificate request to the certificate authority;
digitally signing, by the certificate authority, the new digital certificate request; and
replacing the original certificate specific to the selected crypto-token with the new signed certificate specific to the selected computational component.

17. A system for providing credentials to a selected computational component in a distributed processing network, comprising:
a plurality of crypto-tokens, each crypto-token comprising a unique identifier and a public/private key pair and being configured for operative engagement with a selected computational component;
a provisioning system operable to generate the plurality of crypto-tokens; and
the selected computational component comprising a reader operable to receive and communicate electrically with a selected crypto-token, the selected computational component being operable to use (i) a digital certificate, comprising the unique identifier and the public key and (ii) the private key in the selected crypto-token to establish a secured communication session with the provisioning system, wherein each of the plurality of crypto-tokens are interchangeable to effect establishment of secured communication session with the selected computational component, whereby any of the plurality of crypto-tokens may be engaged with the selected computational component to perform the establishing operation, wherein each crypto-token is not associated with a specific computational component and/or user, and wherein the unique identifier is received out-of-band from the digital certificate.

18. The system of claim 17, wherein the crypto-token comprises the digital certificate, wherein standard and extension portions of the digital certificate, before the establishing step, do not identify a specific computational component, wherein the digital certificate identifies uniquely the corresponding cryto-token, and wherein each crypto-token is not associated with a specific computational component and user.

19. The system of claim 18, wherein the digital certificate in each crypto-token comprises the corresponding unique identifier of the crypto-token, wherein the digital certificate in each crypto-token excludes a unique identifier of any computational component, and wherein the unique identifier of each crypto-token is visible on the outside of the crypto-token.

20. The system of claim 17, wherein the provisioning system, after the establishing operation, is further operable to associate the unique identifier of the selected crypto-token with the computational component, wherein, before the associating function, the unique identifier of the selected crypto-token is not associated specifically with the computational component.

21. The system of claim 17, wherein the plurality of crypto-tokens are not customer-specific any may be used in a computational component purchased by any customer and wherein each crypto-token is not associated with a specific computational component, enterprise network, or user.

22. The system of claim 17, wherein the crypto-token is portable and at least one of a smart card and a dongle and wherein the provisioning system comprises an input operable to receive the unique identifier of the selected crypto-token before or during the establishing operation.

23. The system of claim 17, wherein the unique identifier is provided in a communication that is out-of-band relative to the secured communication session.

24. The system of claim 17, wherein the unique identifier is provided over an unencrypted communication channel and wherein the digital certificate is in a chain of authority, the chain of authority including a root certificate of authority of an issuer of the selected crypto-token, an intermediate digital certificate of licensing generating module, and the digital certificate of the selected crypto-token.

25. The system of claim 17, wherein, after the establishing function, the selected crypto-token and computational component are operable to generate a new unsigned digital certificate request that comprises information specifically identifying the computational component; forward the unsigned digital certificate request to the certificate authority; receive, from the certificate authority, a digitally signed new digital certificate; and replace the original certificate specific to the selected crypto-token with the new signed certificate specific to the computational component.

26. The system of claim 25, wherein the original and new certificates comprise the same public key.

27. The system of claim 25, wherein the new certificate comprises at least one of an enterprise network identifier, a module identifier, and a system identifier.

28. The system of claim 25, wherein the new certificate comprises at least one of a serial number and host name associated with the computational component.

29. The system of claim 17, wherein the provisioning system is further operable, after the establishing operation and during the secured communication session, to forward a license file to the computational component.

30. The system of claim 17, wherein the computational component is at least one of a gateway, a media server, a voice messaging server, an instant messaging server, an email server, and a port network.

31. A crypto-token comprising:
(a) a memory comprising a unique crypto-token identifier, a digital certificate comprising a unique public key and the unique identifier, and a private key; and
(b) a processor operable to:
(i) provide the digital certificate to a first computational component operatively engaged with the crypto-token, and
(ii) to encrypt plain text and decrypt cipher text using the private key, the plain text and cipher text being received from the first computational component,
wherein, at a time of providing to a user, the digital certificate is not specifically associated with the first computational component and/or user, and
whereby the crypto-token may be operatively engaged with a second computational component, and the processor in the second computational component remains operable to perform operations (i) and (ii) for the second computational component, and
wherein the digital certificate does not include an identifier uniquely associated with the first and second computational components and wherein a unique identifier is provided to the first computational component out-of-band from the digital certificate.

32. The crypto-token of claim 31, wherein the digital certificate is not associated with the first computational component, wherein the digital certificate is not associated with the user, and wherein the processor is operable to:
(iii) generate a public/private key pair and (iv) generate the digital certificate.

* * * * *